Aug. 21, 1951  C. W. ELSENHEIMER  2,564,836
NONBLURRABLE MIRROR
Filed Feb. 2, 1949
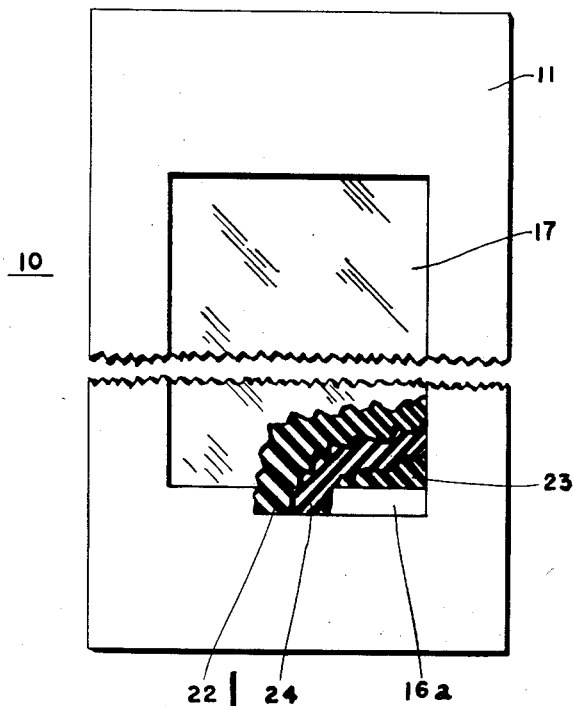
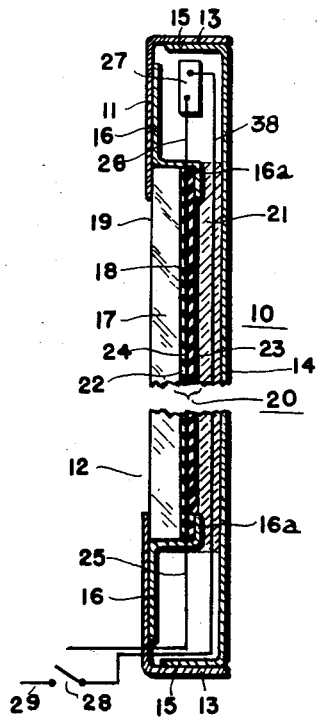
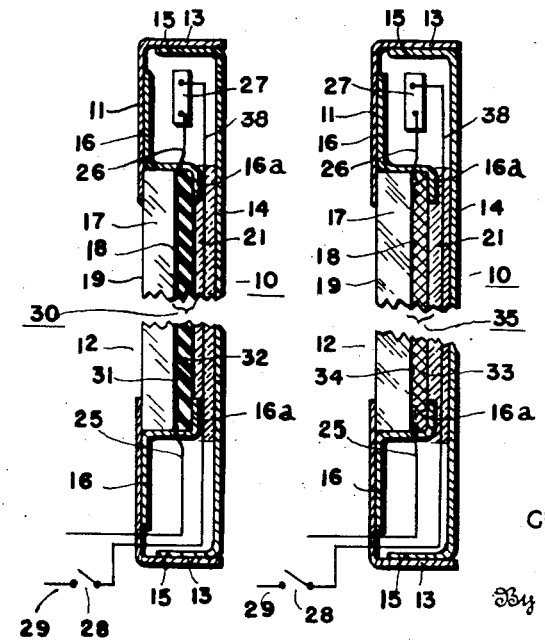
Inventor
CHARLES W. ELSENHEIMER
PATENT AGENT Patented Aug. 21, 1951

2,564,836

UNITED STATES PATENT OFFICE 2,564,836

NONBLURRABLE MIRROR

Charles W. Elsenheimer, Meriden, Conn., assignor to The Charles Parker Company, Meriden, Conn.

Application February 2, 1949, Serial No. 74,101

2 Claims. (Cl. 219—19)

The present invention relates to a so-called non-blurrable mirror, i. e. a mirror having a mirror plate, on the front face of which condensation of water vapor is prevented, such condensation tending to fog or mist the front face of the mirror plate. These non-blurrable mirrors are primarily useful in bath and shower rooms in which usually the condensation of water vapor is so great that the faces of normal mirror plates have to be frequently wiped or dried to obtain a clear and true reflection.

The primary object of the present invention is the provision of an electric heating element or resistance unit of simple, inexpensive and durable construction in intimate contact with the back of the mirror plate, said heating element or unit being adapted to heat said mirror plate to such temperature that condensation of water vapor or moisture cannot occur upon the face of the mirror plate.

Another object of this invention is to provide a mirror plate, to the rear of which a flexible heating unit is applied in such a manner that it snugly contacts said rear substantially over the whole area.

A further object of the invention is a mirror plate in intimate contact with a substantially flat heating element or resistance unit comprising a flexible sheet of a composition, such as a rubber composition, rendered electrically conducting by incorporation of finely divided electrically conducting particles, such as carbon black, opposite edges of said sheet being connected to a source of electric current in such a manner that said sheet is uniformly heated and conveys its heat to the mirror plate thereby preventing condensation of water vapor on the mirror face.

Other and further objects and advantages of the present invention will be apparent from the following description and claims and are illustrated in the accompanying drawings showing, by way of example, preferred embodiments and the principle thereof and what the inventor considers now to be the best mode of applying said principle. Other embodiments of the invention embodying the same or equivalent principles may be used and structural changes may be made as desired by those skilled in the art without departing from the present invention and the purview of the appended claims.

In the drawings,

Fig. 1 is a front view of the mirror embodying this invention, partly broken away to show the underlying construction.

Fig. 2 is a cross section through the mirror of Figure 1, taken along the line 2—2, showing the heating unit.

Fig. 3 is a cross section illustrating a modified embodiment of the heating unit, taken along the line 2—2 of Fig. 1.

Fig. 4 is a cross section showing a further modification of the heating unit, taken likewise along the line 2—2 of Fig. 1.

With reference to Figures 1 and 2 of the drawing, 10 indicates a casing made of any suitable material, such as metal, plastic, or wood, comprising a front frame 11, open at 12, of preferably rectangular shape with bent edges or flanges 13 defining the depth of the casing. A rear or lid member 14 of similar dimensions, shape and material as said frame 11 is likewise provided with bent edges or flanges 15 adapted to engage intimately the edges or flanges 13 of said frame 11 at their inner sides in such a manner that a box-like casing of relatively small depth is obtained. The engaging flanges 13 and 15 may be firmly joined in a suitable manner, for example, by bolts, soldering, welding, etc.

S-shaped clamps or holding means 16 for a mirror plate 17 are mounted on the inside of the front frame 11 at proper locations, so that said mirror plate 17 which is slightly larger than the front opening 12 of said frame 11 covers the opening 12, while the edges of said mirror plate 17 extend slightly beyond the rim of said opening. These S-shaped clamps or holding means 16 made of metal or plastic material are secured to said frame 11, for example by means of rivets, screws, or by spot-welding. The mirror plate 17 in the present embodiment is made of plate glass treated or coated on the rear side in the usual manner to provide a reflecting rear surface 18, while the opposite side or front face 19 of the mirror plate is uncoated and transparent. In place of such plate glass mirror of normal construction, other types of mirror plates, including mirror plates of metal may be used.

A flat heating unit 20 of substantially the same area as the mirror plate 17 is inserted between the rear 18 of said plate 17 and the free, bent portions 16a of the S-shaped clamps or holding means 16 of said plate 17, said clamps or holding means 16 supporting the heating unit 20 and holding it resiliently under slight pressure against the rear 18 of the mirror plate 17. This heating unit may be cemented to said rear 18. The empty space within the box-like casing, behind the heating unit 20, may be filled with a suitable inexpensive filler 21 having refractory or heat-insulating properties, for example with rockwool, cardboard, etc. to prevent heat losses and separation of the heating unit 20 from the rear of the mirror plate 17 at the places, where no clamps 16 are applied, and to assure an intimate contact between the rear 18 of the mirror plate 17 and the heating unit 20 throughout the whole surface area.

The heating unit 20 has three layers, the two outer ones 22 and 23 being made of sheets of equal area of ordinary, soft, flexible, electrically insulating rubber, while the intermediate or center layer 24 forming the resistance member proper is a sheet of an electrically conducting rubber composition, which may be prepared as described in U. S. Patent No. 2,255,376 by incorporating or dispersing uniformly conducting particles, such as carbon black, into the rubber mixture during its process of manufacture. In place of this rubber composition sheet, any other flexible composition sheet rendered conducting by any process other than described in the aforementioned United States patent may be used. These two insulating layers 22 and 23 and the intermediate conducting sheet 24 are joined by vulcanizing, resulting in an integral structure forming the heating unit 20. Conductors or wires 25 and 26 are attached to and along two opposite marginal portions of said conducting sheet 24, said two conductors or wires running across substantially the entire width of said sheet 24. Preferably these conductors or wires 25 and 26 are tinned at their places of contact with said sheet 24, i. e. they are tinned along the whole length of the edges of said conducting sheet 24. To assure a firm contact with the sheet 24, said conductors or wires 25 and 26 are solidly secured to the heating unit 20 during the vulcanization of the three sheets constituting said unit. The mechanical connection between said conductors or wires 25 and 26 and the edges of said sheet 24 may be further improved by folding the marginal portions of said edges of the conducting sheet 24 around the conductors or wires 25 and 26, as is described in the aforementioned U. S. Patent No. 2,255,376. The bent portions 16a of said clamps 16 at the top and the bottom of said heating unit 20 exert pressure primarily at the locations, where the conductors or wires 25 and 26 are secured to said marginal portions across said conducting sheet 24, thus assuring a firm contact along said portions which will not be impaired by or during the heating of said unit 20.

A thermostatic switch 27 of suitable construction and characteristic may be mounted in the casing 10 at a suitable place and may be electrically connected or inserted in the electric heating circuit of the unit. In the present embodiment shown in Fig. 2, said thermostat 27 is mounted in the upper part of the casing 10, and the wire 26 is leading to said thermostat. A wire 38 connects the thermostat 27 with a manual switch 28 to be operated by the user of the mirror. An outgoing wire 29 connected to said manual switch 28 and the wire 25 directly attached to said conductive sheet 24 can be connected to any electric network in the usual manner.

When the manual switch 28 is closed, the circuit through said conducting sheet 24 is completed. Said sheet is traversed substantially uniformly by the energizing current, because the wires 25 and 26 are connected or attached to said sheet 24 along the entire length of its edges. As a result of this, a uniform current density throughout the whole sheet 24 and consequently a uniform heat distribution over the whole sheet surface is obtained. The heat produced in the sheet 24 is readily conveyed to the rear 18 of said mirror plate 17 due to the intimate contact with the heating unit 20 and to the front face 19 of said mirror plate, on which vapor condensation or moisture is prevented or rapidly removed. The thermostat 27 controls the temperature of the heating unit 20 in a conventional manner. The primary advantage of the provision of this thermostat in the present device is that the heating unit 20 can be dimensioned for a higher current density resutling in a quicker heating action and prevention of any condensation on the mirror face, whereby overheating is safely prevented by the intermittent operation of the heating unit 20 under control of said thermostatic switch 27.

The modified heating unit 30, shown in Fig. 3, comprises only two rubber layers, i. e. an electrically conducting rubber sheet 31 of the same properties as the intermediate sheet 24 in Fig. 2 and an electrically insulating rubber layer 32 similar to layer 23 in Fig. 2. These two sheets or layers 31 and 32 may be joined to form the integral heating unit 30 by the same vulcanization step indicated in the foregoing with respect to the manufacture of the heating unit 20, shown in Fig. 2, whereby likewise the wires 25 and 26 will be secured to the conducting sheet 31 by vulcanization. According to Fig. 3, the electrically conducting rubber sheet 31 is directly pressed against the rear 18 of the mirror plate glass 17, while the electrically insulating layer 32 is facing the bent portions 16a and the filler material 21 in the rear of the casing 10. The heating unit 30 may be cemented to the rear 18 of the mirror plate 17. If the mirror plate is of metal, an insulating coating may be provided on the rear 18 and/or on that side of the electrically conducting sheet 31 which contacts said rear 18.

In a further modification of the heating unit, shown in Fig. 4, one side of flexible panel or sheet 33 of any kind of electrically insulating and heat resistant material, such as fiber, asbestos, woven glass, or plastic, is treated or provided with a coating 34 of an electrically conducting material or cement, which may be made of the same rubber composition as the conducting sheets 24 and 31 in Figs. 2 and 3, respectively. This conducting coating 34 may be applied to said panel or sheet 33 by dipping, painting, or spraying. The wires 25 and 26 may be connected to the conducting coating 34 in principally the same manner as in the embodiments of the heating units 20 and 30, shown in Figs. 2 and 3, respectively. The joint between the coating 34 and the wires 25 and 26 is improved and an integral heating unit 35 obtained by vulcanization as in the previous embodiments. The heating unit 35, as shown in Fig. 4, is pressed against the rear 18 of the mirror glass plate 17, with the coated side 34 facing said rear, by means of the clamps 16 in the same manner as in the embodiments of Figs. 2 and 3. The heating unit 35 may be cemented to said rear 18.

The new non-blurrable mirror construction may be combined or associated with any kind of fixture or furniture, in particular with the doors of medicine cabinets in bath and shower rooms. The heating unit can be applied without difficulties to arched mirror plates, because it is flexible. As the heating unit is made of soft or resilient material, such as rubber compositions, it constitutes a good backing or cushioned support for the adjacent mirror glass plate. Consequently the latter will not crack, when heated or otherwise subjected to mechanical stresses. A further advantage of the inventive structure is that the heating unit can be easily installed in the present fixtures or pieces of furniture without necessitating major changes thereof. The heating unit can be cut to any shape and size of mirror plate to which it is to be applied. The new mirror may be applied to various instruments in which condensation on the reflectors is disturbing. For example, the invention may be applied to dentists' mirrors.

I claim:

1. A non-blurrable mirror comprising in combination, a mirror plate having a front and a rear surface—and a mirror coating on said rear surface, a flexible and compressible electrical heating unit covering said rear surface and snugly applied thereto, said heating unit including an electrically conducting layer of a rubber-like composition of substantially the same area as said heating unit, said composition containing carbon black uniformly dispersed therein, electric conductors adapted to be connected to a source of electric current, said conductors being firmly attached to two opposite edges of said layer along the entire lengths of said edges, and means adapted to clamp said heating unit to said mirror plate at the places of connection between said conductors and said edges.

2. A non-blurrable mirror comprising in combination, a box-like casing having an opening at its front wall and a solid rear wall, a mirror plate of somewhat larger area than that of said opening being mounted within said casing and covering said opening, said mirror plate having a front and rear surface, the edges of said mirror plate extending beyond the rim of said opening, a compressible electric heating unit covering said rear surface of said mirror plate, means adapted to electrically connect said heating unit to a source of current outside of said casing, and S-shaped clamping members adapted to support said mirror plate and said heating unit and holding them under slight pressure against each other and the mirror plate against the rim of the opening of said casing primarily at the places of electric contact between said electric connecting means and said heating unit, said S-shaped clamping members being secured to the front wall inside said casing.

CHARLES W. ELSENHEIMER.

REFERENCES CITED

The following references are of record in the file of this patent:

UNITED STATES PATENTS

| Number | Name | Date |
|---|---|---|
| 2,015,816 | Pyzel | Oct. 1, 1935 |
| 2,255,376 | Bull et al. | Sept. 9, 1941 |
| 2,404,736 | Marick | July 23, 1946 |